United States Patent [19]

Hassiotis et al.

[11] Patent Number: 5,240,333
[45] Date of Patent: Aug. 31, 1993

[54] WHEEL BEARING UNIT HAVING ROTATION SPEED DETECTION

[75] Inventors: Vasilis Hassiotis, Schweinfurt; Johannes Schottdorf, Hammelburg; Manfred Tröster, Bad Kissingen, all of Fed. Rep. of Germany

[73] Assignee: Fag Kugelfischer Georg Schafer KGaA, Fed. Rep. of Germany

[21] Appl. No.: 962,534

[22] Filed: Oct. 16, 1992

[30] Foreign Application Priority Data

Oct. 18, 1991 [DE] Fed. Rep. of Germany ....... 4134434

[51] Int. Cl.$^5$ .............................................. F16C 19/08
[52] U.S. Cl. ................................... 384/448; 384/537
[58] Field of Search ............... 384/448, 446, 537, 510, 384/512, 585

[56] References Cited

U.S. PATENT DOCUMENTS

| 4,732,494 | 3/1988 | Guers et al. | 384/448 |
| 5,011,303 | 4/1991 | Caron | 384/446 |
| 5,125,845 | 6/1992 | Benktander et al. | 384/448 |
| 5,143,458 | 9/1992 | Alff et al. | 384/448 |

FOREIGN PATENT DOCUMENTS 0323159 12/1988 European Pat. Off. .
3418440 5/1984 Fed. Rep. of Germany .

*Primary Examiner*—Lenard A. Footland
*Attorney, Agent, or Firm*—Ostrolenk, Faber, Gerb & Soffen

[57] ABSTRACT

A wheel bearing unit for vehicles having a speed of rotation detector. An inner ring of the wheel bearing unit is mounted on an axial shoulder of the wheel hub. The inner ring is retained axially by a bead formed by plastic deformation of the rear end of the shoulder. Elevations protrude axially rearwardly around the circumference of the bead. An axial depression into the rear of the hub at the hub axis. The passage of the elevations are sensed by a rotation detector spaced from the rear end of the hub.

17 Claims, 1 Drawing Sheet

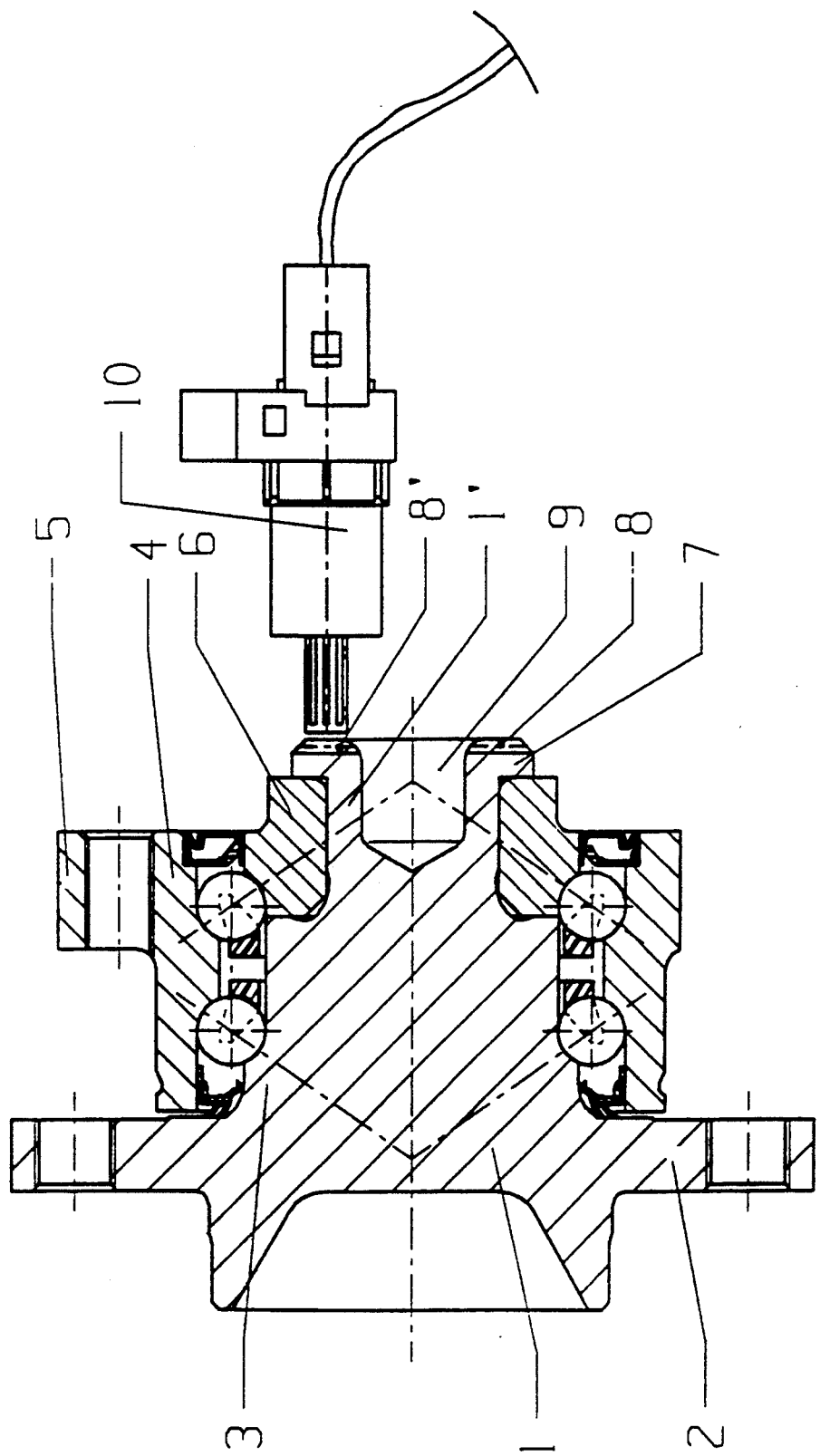

WHEEL BEARING UNIT HAVING ROTATION SPEED DETECTION

BACKGROUND OF THE INVENTION

The present invention relates to a wheel bearing unit for vehicles having a device for determining the speed of rotation of the wheel.

Wheel bearing units are known which have at least one race which is developed as a hub, and which is provided with an attachment flange. For ease of assembly, at least one inner ring of a double-row angular anti-friction bearing of the wheel bearing unit is frequently manufactured separately, and is then installed on a shoulder of the hub. The hub also bears the other inner ring. After installation, the separately manufactured inner ring must then be fastened axially. Federal Republic of Germany Application OS 34 18 440 teaches fixing the separate inner ring in place with a bead formed by plastic deformation of the shoulder of the hub. The bead is provided opposite to the outer end side of the inner ring to axially fasten the inner ring.

Furthermore, in a vehicle using such a bearing, it is often necessary to determine the speed of rotation of the wheel for example, in connection with an anti-lock bearing system dependent upon wheel spin rate.

Prior art teaches providing the rotating bearing parts with a pulse ring. Interruptions on the pulse ring are situated opposite to a rotation detector which senses the speed of rotation. For example, one such embodiment is shown in "ATZ Automobiltechnische Zeitung", 90 (188) 3, page 116.

Such known wheel bearing units are, however, expensive and occupy too much space. In the known wheel bearing units, it is necessary to manufacture a separate pulse ring, and to mount it on the wheel bearing unit, at some added expense. Frequently, this approach also fails to provide the accuracy required in determining the speed of rotation. Moreover, the pulse ring in such an arrangement occupies additional space in the wheel bearing unit.

European Patent Application EP-323,159, discloses an automobile wheel bearing unit having a separate inner ring with projections directly and integrally formed on an end surface of the inner ring. In this case, however, the above-mentioned disadvantages of the prior art are present. For example, there is disturbance of the signals to the sensor by a nut and washer provided as attachment means to fix the inner ring to the wheel bearing unit. Moreover, the inner ring has a relatively complicated shape, which is technologically difficult to manufacture, and expensive to use in view of the special tools required for anti-friction bearings.

SUMMARY OF THE INVENTION

Therefore, an object of the present invention is to provide a wheel bearing unit which does not have the above-mentioned disadvantages.

A further object of the present invention is to provide, in combination with the wheel bearing unit, a device for determining the speed of rotation.

Another object of the present invention is to combine the wheel bearing unit and the device for determining the speed of rotation in a space-saving manner using simple means, while simultaneously obtaining the precision necessary for exact detection of the speed of rotation by the sensor.

In accordance with the invention, the inner ring holding bead on the shoulder of the hub has interruptions which are distributed uniformly on its circumference. The interruptions are produced at the same time as the bead, resulting in simple manufacture. Consequently, if the radial guidance of the deforming ram is precisely established, as is basically necessary in view of the high deformation forces which are applied to form the holding bead, an exact distribution of the interruptions is simultaneously obtained around the circumference of the bead. A sensor, arranged a slight distance away from the interruptions, will then determine and transmit information as to the speed of rotation of the wheel with an accuracy necessary for an anti-lock braking system.

The signals thereby obtained from the rotation detector are precise for another reason. Since the interruptions are arranged on an end side of the wheel bearing unit, in the form of elevations on the bead, there are no other moving parts proximate to the rotation detector to disturb the accuracy of the measurements. Since the elevations defining the interruptions protrude slightly in an axial direction with respect to the other parts, they are set apart from the rest of the wheel bearing unit enabling them to be more accurately sensed by the rotation detector.

The present invention, in contrast to EP-323,159, is particularly favorable since it performs a combination of two functions. The bead is used not only for the axial fixing of the inner ring, it simultaneously serves as a pulse transmitter for measurement of the speed of rotation. The manufacture of the inventive device is simple as compared to the prior art since it is possible to produce the spur toothing defining the interruptions in one manufacturing operation together with the fixing bead. Therefore, separate pulse rings, which result in additional mounting expense, are not required. Furthermore, the present invention avoids the widening of the rings upon assembly, which frequently occurs in the case of separate rings. Such an occurrence could cause error in measurement.

Other features and advantages of the present invention will become apparent from the following description of the invention which refers to the accompanying drawings.

BRIEF DESCRIPTION OF THE DRAWINGS

The drawing shows a longitudinal section of a wheel bearing unit according to the present invention.

DETAILED DESCRIPTION OF THE INVENTION

FIG. 1 shows a wheel bearing unit comprising a hub 1 which is provided with a fastening flange 2 toward one axial side. An inner ring 3, of a double-row angular ball bearing, is provided integrally with the hub 1 and projects axially away from the flange.

An outer ring 4 of the angular ball bearing is provided around and spaced out from the inner ring. It has a fastening flange 5 defined radially outward of the ring 4.

A second inner ring 6 separate from the hub is also provided. The second separate inner ring 6 is seated on a shoulder 1' of the hub 1. The ring 6 supports one annular row of rolling elements on ball bearings between the rings 4 and 6. The hub 1 and ring 4 support the other annular row of balls.

For axial fastening of the inner ring 6 at the hub, a plastically deformed holding bead 7 is formed by plastic deformation of the end of the shoulder 1' of the hub 1.

The outwardly deformed bead 7 grips the inner ring 6 around its axially outer end surface. Thus, a structural unit of the bearing is obtained simultaneously with formation of the holding bead 7.

The manufacture of the bead 7 includes forming interruptions 8 therein. The interruptions 8 may be advantageously formed as a series of elevations 8', which are uniformly distributed around the circumference of the end part of the bead 7. The elevations 8' are formed at the same time as the bead 7 using known means, such as a stamping press. The elevations 8' extend somewhat beyond the other parts of the bead, the hub and the rest of the bearing unit, and thus face the sensor 10 without any other disturbing elements.

It is also advantageous to provide a depression 9 in the axial region of the hub 1 to simplify the plastic deformation. This arrangement has another advantage. As a result of the depression 9 no material is present in that area to disturb the sensor 10. Furthermore, this arrangement allows the elevations 8' to end on the circumference of the bead 7 since they are not required in this area of the hub shoulder 1'. The sensor 10 is a conventional metal detector which detects and counts each interruption as it passes. It is connected to conventional means, like an anti-lock braking system which respond to the detected rotation rate.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A wheel bearing unit for vehicles having rotation speed detection, the wheel bearing unit comprising:
   a hub having an axial shoulder extending axially rearward and the hub having a rear end;
   an inner ring of the bearing unit mounted on the periphery of the shoulder toward the rear end; an outer ring around the inner ring, and a row of bearing rolling elements between the outer and the inner rings;
   the shoulder having an end, an axial depression defined in the rear end of the hub extending inside the shoulder at the hub axis;
   a bead formed at the end of the shoulder for axially fixing the inner ring on the shoulder; detectable means at the rear end of the hub around the circumference of the bead and around the depression and rotating with the bead; and
   a rotation speed detector spaced apart from the bead and the end of the hub for detecting movement of the detectable means on the bead past the detector.

2. The wheel bearing unit in claim 1, wherein the bearing is an angular anti-friction bearing.

3. The wheel bearing unit in claim 1, wherein the bead is formed by plastic deformation of the shoulder at the hub rear end.

4. The wheel bearing unit in claim 3, wherein the detectable means on the bead are formed simultaneously with the plastic deformation of the shoulder.

5. The wheel bearing unit in claim 4, wherein the detectable means on the bead comprise interruptions in and are distributed uniformly around the bead circumference.

6. The wheel bearing unit in claim 5, wherein the interruptions comprise elevations protruding axially rearward from the bead circumference.

7. The wheel bearing unit in claim 6, wherein the inner ring has an axially outer end surface and the bead is formed around the outer end surface of the inner ring.

8. The wheel bearing unit in claim 1, wherein the detectable means on the bead comprise interruptions in and are distributed uniformly around the bead circumference.

9. The wheel bearing unit in claim 8, wherein the interruptions comprise elevations protruding axially rearwardly from the bead circumference.

10. The wheel bearing unit in claim 1, wherein the inner ring has an axially outer end surface and the bead is formed around the outer end surface of the inner ring.

11. The wheel bearing unit in claim 1, wherein the hub periphery defines a second inner ring next to the inner ring on the shoulder; a respective row of the bearing elements on the hub inner ring and on the inner ring on the shoulder; the outer ring extending around both inner rings.

12. A wheel bearing unit for vehicles having rotation speed detection, the wheel bearing unit comprising:
    a hub having an axial shoulder extending axially rearward and the hub having a rear end;
    the bearing including an inner ring of the bearing unit mounted on the shoulder toward the rear end;
    the shoulder having an end;
    a bead formed at the end of the shoulder for axially fixing the inner ring on the shoulder; detectable means at the rear end of the hub around the circumference of the bead and rotating with the bead; and
    a rotation speed detector spaced apart from the bead and the end of the hub shoulder for detecting movement of the detectable means on the bead past the detector.

13. The wheel bearing unit in claim 12, wherein the detectable means on the bead comprise interruptions in and are distributed uniformly around the bead circumference.

14. The wheel bearing unit in claim 13, wherein the interruptions comprise elevations protruding axially rearward from the bead circumference.

15. The wheel bearing unit in claim 12, wherein the inner ring has an axially outer end surface and the bead is formed around the outer end surface of the inner ring.

16. The wheel bearing unit in claim 15, wherein the detectable means on the bead comprise interruptions in and are distributed uniformly around the bead circumference.

17. The wheel bearing unit in claim 12, wherein the hub periphery defines a second inner ring next to the inner ring on the shoulder; a respective row of the bearing elements on the hub inner ring and on the inner ring on the shoulder; the outer ring extending around both inner rings.

* * * * *